United States Patent [19]
Brown et al.

[11] Patent Number: 5,889,994
[45] Date of Patent: Mar. 30, 1999

[54] METHOD FOR CATALOGING GRAPHICS PRIMITIVES BY RENDERING STATE

[75] Inventors: John M. Brown; Gautam Mehrotra, both of Fort Collins, Colo.

[73] Assignee: Hewlett-Packard, Co., Palo Alto, Calif.

[21] Appl. No.: 775,272

[22] Filed: Mar. 27, 1997

[51] Int. Cl.[6] .................................................. G06F 12/00

[52] U.S. Cl. ........................ 395/704; 395/701; 395/704; 395/710; 345/433; 345/441

[58] Field of Search .................... 395/701, 704, 395/183.08, 183.11, 183.13, 183.14, 184.01, 500; 707/102; 345/433, 133, 522, 506, 501–502, 139, 508, 339, 519, 340, 346, 420, 422, 430, 434, 435, 440, 509, 526, 441

[56] References Cited

U.S. PATENT DOCUMENTS

| | | | |
|---|---|---|---|
| 4,910,683 | 3/1990 | Bishop et al. | 345/427 |
| 5,027,291 | 6/1991 | Callahan et al. | 345/157 |
| 5,249,265 | 9/1993 | Liang | 395/710 |
| 5,255,359 | 10/1993 | Ebbers et al. | 345/433 |
| 5,307,450 | 4/1994 | Grossman | 345/423 |
| 5,325,485 | 6/1994 | Hochmuth et al. | 345/505 |
| 5,617,548 | 4/1997 | West et al. | 345/326 |
| 5,649,173 | 7/1997 | Lentz | 345/501 |
| 5,745,118 | 4/1998 | Alcorn et al. | 345/430 |
| 5,764,243 | 6/1998 | Baldwin | 345/506 |

*Primary Examiner*—James P. Tremmell
*Assistant Examiner*—Cuong H. Nguyen

[57] ABSTRACT

A method according to the invention analyzes the generation of graphical images by cataloging primitives by the states in which they are rendered. It permits, for example, for analysis of the execution of a computer instruction sequence, e.g., a computer program, of the type that generates a graphical image from a plurality of primitives. The method includes the steps of identifying primitives rendered by the instruction sequence, along with the composite graphical states in which those primitives are rendered. The method further includes generating an output signal characterizing the program, i.e., via cataloging the primitives by the states in which they were rendered.

11 Claims, 3 Drawing Sheets

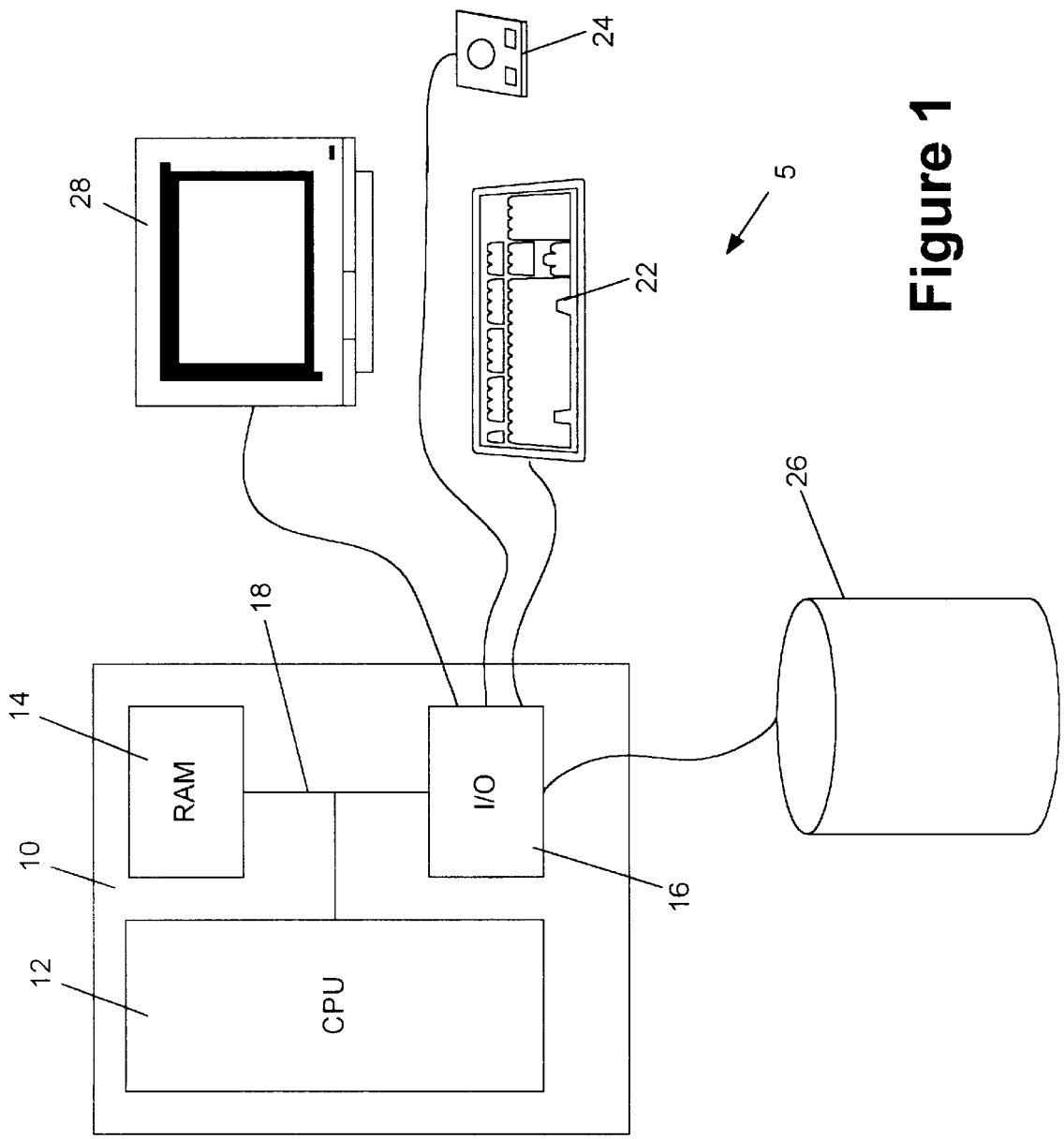

METHOD FOR CATALOGING GRAPHICS PRIMITIVES BY RENDERING STATE

BACKGROUND OF THE INVENTION

The invention pertains to computer graphics and, more particularly, to methods for analyzing the generation of graphical images. The invention has application, for example, in facilitating the tuning and optimization of three-dimensional graphics software.

Computers have long been used to generate graphical images. Though early computer systems were capable of imaging in only two dimensions, they found ready acceptance in automated drafting, cartography, and the like. By the mid-1970's, three-dimensional graphics systems became commercially available. The systems tended to be quite expensive, requiring dedicated hardware and custom software.

Over the years standardized graphical programming interfaces and libraries have become readily available in the marketplace. Applications programs can now be written to generate three-dimensional images by calling subroutines (or functions) provided in industry-standard graphics libraries, such as those complying with the "OpenGL" specification. The relative ease with which graphics can be generated has led to a proliferation of graphics applications, e.g., for business, technical and scientific simulation, user interfaces, and animation.

Computer generation of graphical images, particularly, three-dimensional images, is a computationally intensive task. Even for a simple wire frame image, in which only the edges of an object are drawn, numerous mathematical calculations are required, e.g., to give the object perspective and to display it from the vantagepoint of the viewer. The numbers of calculations increase dramatically when objects are imaged as solid bodies, that is, when their surfaces (rather than merely their edges) are rendered. In those instances, the systems must take into account hidden surfaces, color, shading, texture, illumination, and other attributes of the object and its surfaces.

A common technique for imaging three-dimensional solid bodies is by constructing complex surfaces from "primitive" geometric shapes, such as lines, triangles, squares and other polyhedrons. An image of a desk, for example, may be rendered by drawing tens or hundreds of thousands of small line segments and triangles, placed side-by-side and individually textured to represent corresponding surfaces of the actual desk.

The sheer numbers of primitives required for a typical scene can make debugging or other analyses of the rendering process quite difficult. If a scene takes too long to render, a programmer could attempt to track all of the calls made by the underlying applications program to the graphics library. Unfortunately, the numbers of graphics calls made in drawing a scene can be several factors larger than the number of primitives themselves. Tracking that many calls in a meaningful way, though sometimes necessary, can be virtually impossible.

The prior art provides some assistance in this regard. Some conventional graphics packages permit graphics usage to be cataloged by the types of primitives rendered. Such an analysis, for example, might reveal that a graphics program for drawing a desk rendered thirty thousand line segment primitives and twenty-five thousand triangles primitives. Though sometimes sufficient, even this analysis is not adequate to enable the programmer to analyze a graphics program qualitatively and quantitatively.

An object of this invention is to facilitate improvements in the quality and performance of computer graphics applications. A more particular object is to provide methods for determining the image generating characteristics of such applications programs.

A related object of the invention is to provide improved methods of analyzing the usage of a library of graphics routines for debugging, tuning or optimizing the generation of images.

Yet another object is to provide such methods for use in analyzing executing computer programs, as well as those that are in source code format.

Yet still another object of the invention is to provide such methods for use in analyzing computer programs that generate three-dimensional images.

SUMMARY OF THE INVENTION

The aforementioned objects are among those attained by the invention, which provides methods for analyzing the generation of graphical images by cataloging primitives according to the states in which they are rendered.

More particularly, in one aspect the invention provides a method of determining a characteristic of a computer instruction sequence, e.g., a computer program, of the type that generates a graphical image comprising a plurality of primitives. The method includes the steps of identifying primitives rendered by the instruction sequence, along with the graphical states in which those primitives are rendered. Graphical states, in this regard, refer to the collective substates with which a primitive is rendered. Examples include combinations of the substates illumination, shading, texture, and so forth.

The method further includes generating a signal representing a characteristic of the instruction sequence, particularly, one indicating the composite graphical states in which the sequence renders primitives and indicating which primitives are rendered in those states. That signal can be stored in a record or data structure contained in a store, e.g., random access memory or disk drive, of a digital data processor. It can also be used to generate a display, e.g., on a monitor or printer.

In a related aspect, the invention provides methods for quantifying the amount of state switching during image generation. This aspect of the invention provides a method as described above, further including a step of counting, for each state in which a primitive is rendered, the number of times that a primitive is rendered in that state subsequent to the rendering of a primitive in a different state. Each count can be indicated, along with its respective state, in the aforementioned signal.

The invention provides, in yet another related aspect, a method that includes a step for quantifying the redundant setting of graphical states. This aspect of the invention provides a method as described above, further including a step for counting, for each graphical state, the number of times that an attempt is made to set a substate that is already defined in the current state. This aspect of the invention likewise provides for the inclusion of those "redundancy" counts in the aforementioned signal.

In other aspects, the invention provides a method of analyzing a computer instruction sequence of the type that generates a graphical image by executing (i) primitive-drawing instructions for rendering graphical primitives, and (ii) state-setting instructions for setting substates that define a composite graphical state. The method includes the step of responding to a state-setting instruction for identifying a current composite graphical state, i.e., the composite state defined by all currently set substates. It further includes the step of responding to a primitive-drawing instruction for generating a storage record, e.g., a data structure, that identifies the current composite graphical state and the primitive being rendered by the primitive-drawing instruction. In cases where a primitive has already been rendered in a composite state like the current one, the record associated with that state is accessed and updated to include the identity of the primitive being rendered by the current primitive-drawing instruction. A signal generated by the method identifies the primitives by the states in which they were rendered.

Further aspects of the invention provide a method as described above in which an executable form of the instruction sequence, e.g., object code, is executed on a digital data processor. At least selected subroutine and function calls issued by the program are intercepted (e.g., by "shell" or "stub" procedures) in order to identify primitive-setting instructions and state-setting instructions. In an alternative aspect of the invention, those instructions are identified by an interpreter that parses a source code form of the instruction sequence.

These and other aspects of the invention are evident in the drawings and in the description that follows.

BRIEF DESCRIPTION OF THE DRAWINGS

A more complete understanding of the invention may be attained by reference to the drawings, in which:

FIG. 1 depicts a digital data processing systems of the type in which the invention is practiced;

DETAILED DESCRIPTION OF THE ILLUSTRATED EMBODIMENT

Figure 2A:
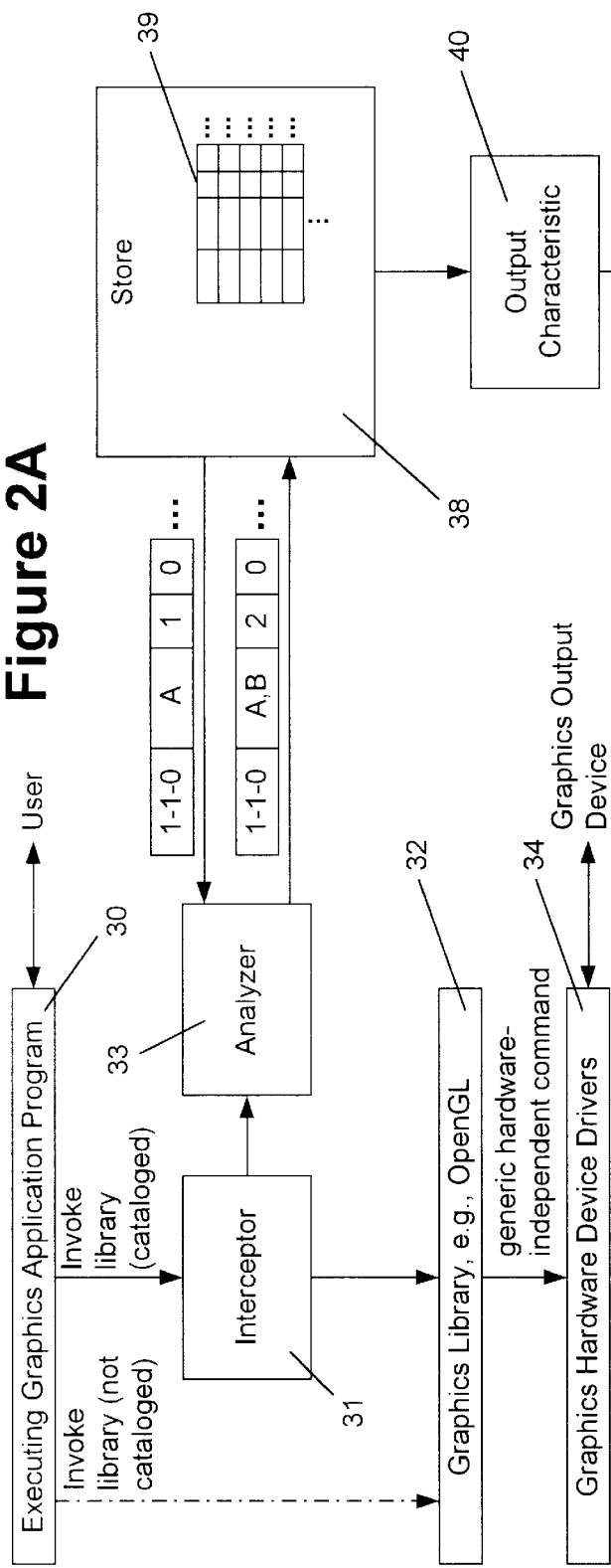
FIG. 2A depicts a system according to the invention for analyzing the generation of graphical images.

FIG. 1 depicts a digital data processing system 5 of the type used to practice the invention. The system 5 includes a digital data processor 10 including a central processing unit 12, random access memory 14 and input/output controller 16 interconnected by backplane or bus 18. Keyboard 22 and pointing device 24, along with other input devices (not shown), are coupled to the computer 10 via input/output controller 16 for entry of data and control information. The computer 10 is also connected to a disk drive 26, as well as other static storage devices (not shown), for access and storage of information. Monitor 28, as well as other output devices (not shown) are likewise coupled to controller 16 for display of information, such as three-dimensional graphics.

Illustrated system 5, including components 10–28, can be any known general-purpose or special-purpose computing system. Preferably, they are three-dimensional graphics-capable workstations, for example, of the type available from the assignee hereof, programmed and/or operated in accord with the teachings hereof for improved analysis of graphics generation.

Referring to FIG. 2A, in one embodiment of the invention, the illustrated digital data processing system 5 executes an applications program 30 that responds to instructions received from the user, e.g., via input devices 22, 24, to perform a specific graphics task, e.g., generating a three-dimensional image of a desk. To facilitate generation of graphics on output devices 28, the applications program 30 generates calls to procedures contained in a graphics library 32. At least selected ones of those calls are identified by interceptor element 31 for analysis and cataloging according to the invention, while others are passed directly to the library 32, without analysis.

The graphics library 32 initializes data structures, tracks the state of objects being rendered, and issues commands to hardware device driver 34 to display the graphics. It represents any set of procedures and data structures, e.g., procedural or object-oriented in nature, that maintain data structures and issue commands (typically, hardware-independent) for display of graphics. That library can operate in accord with any industry standard, such as the OpenGL applications program interface (API) specification. Likewise, it can operate in accord with any vendor-specific or ad hoc standards. Though the illustrated embodiment of the invention assumes the existence of (and makes beneficial use of) the library 32, other embodiments of the invention do not require that element.

Device driver 34 interprets and reformats those commands as hardware-specific instructions, which it transmits to the monitor 28, printer or other output device for display of the desired graphic image. It represents any software driver, commercially available or otherwise, for driving hardware-specific commands to the output device 28. Though the illustrated embodiment includes driver 34, other embodiments of the invention do not.

Applications program 30 represents object code or other instructions executing on digital data processor 10. It can be, for example, a special-purpose computer program for creating and manipulating an image of a specific object, e.g., a desk. It may also be, by way of further example, a computer-aided design (CAD) or other general-purpose graphics program capable of generating an image of an object in response to a command issued by the user.

In the embodiment of FIG. 2A, interceptor element 31 identifies function or procedure calls (collectively, "procedure calls") that are made by the applications program 30 to library 32 and that effect the drawing of primitives or the setting of their states. In a preferred embodiment for use with an OpenGL-compatible library, the primitive-drawing calls include the functions glBegin, glEnd, glVertex, and the like, while the state-setting calls include the functions such as glCullFace, glDepthFunc, glDisable, glEnable, glFrustum, glLightModel, glLight, glLineWidth, glPointSize, glPolygonMode, glRenderMode, and glShadeModel, among others. It will be appreciated that attribute-setting calls, such as glColor and glLoadMatrix, can be treated in the same manner as the state-stetting calls.

Those skilled in the art will appreciate that, in embodiments used with libraries compatible with other industry or proprietary standards, interceptor 31 identifies analogous calls for drawing primitives or setting their states. The interceptor 31 likewise identifies analogous calls or instructions (i.e., instructions for drawing primitives or for setting states) in embodiments where no library 32 is utilized—i.e., where the applications program 30 directly calls the driver 34 or output device 28.

The interceptor 31 preferably identifies library calls (or other calls and instructions) non-invasively, i.e., without the affecting the source code of the applications program 30 or library 32. In the embodiment of FIG. 2A, this is realized by implementing the interceptor 31 as "shell" or "stub" procedures having the same names and parameter lists as the calls to be analyzed. The shell procedures can be implemented, for example, as dynamically linked libraries (DLL's) that are linked with the application program 30 prior to linking of the library 32. Those skilled in the art will, of course, appreciate that the shell procedures can be linked to the applications program 30 in any number of others ways commonly known in the art.

Figure 2B:
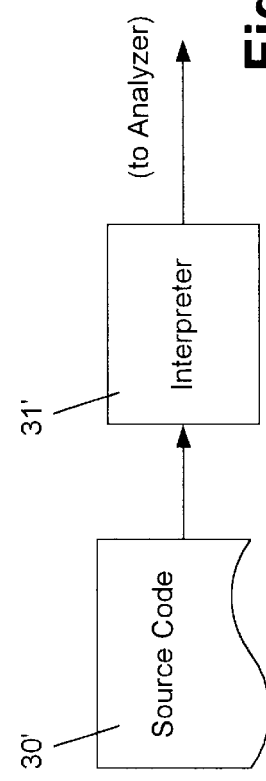
FIG. 2B depicts an alternate technique for identifying graphics calls made by an applications program.

Those skilled in the art will appreciate that calls made by applications program 30 to library 32 can be identified in other ways, as well. For example, as shown in FIG. 2B, an interpreter 31' is used to parse a source code stream, e.g., contained in file 30' representing the applications program 30 in source code format.

Such a source code file can be of the type generated using methods of the type disclosed in copending, commonly assigned U.S. patent application Ser. No. 08/775,271, filed concurrently herewith, by inventors John M. Brown, Don W. Dyer, Gautam Mehrotra, and Carol L. Lang, the teachings of which are incorporated herein by reference. In accord with the teachings of that application, source code instructions corresponding to calls issued by an executing computer program are recorded in a file. That source code file can serve as file 30', with its calls being identified by interpreter 31'. Alternatively, that file can be compiled and executed on digital data processor 10, with its calls being identified by interceptor 31.

The interpreter 31', which is of the type commonly used in the art, parses the source code in a conventional manner to identify state-setting and primitive-drawing instructions therein. Thus, whereas interceptor 31 identifies such instructions via intercepting calls issued by the executing applications program 30, interpreter 31' does so via parsing the corresponding source code 30'.

In addition to the above, further embodiments of the invention contemplate invasive techniques for identifying primitive-drawing and state-setting instructions—such as incorporating, directly into the applications program 30 or library 32, programming statements that generate an output signal identifying each call as it is made.

In a preferred embodiment, all procedure calls issued by the applications program 30 to the library 32 are intercepted for analysis by element 31. In alternate embodiments, calls that do not affect the state or drawing of primitives are not intercepted and tracked. This could include, for example, state-retrieving calls such as glGetLight (along with other calls in the form of glGetXxxxx).

The identities and parameters of state-setting calls and primitive-drawing calls identified by interceptor 31 (and interpreter 31') are supplied to analyzer 33, which characterizes the applications program 30 (or its source code equivalent 30') by cataloging the primitives it draws vis-a-vis the states in which they are drawn. Intermediate and final records 39, or other data structures, reflecting that characterization are contained in store 38, which may reside in dynamic or static memory in the digital data processor, e.g., RAM 14 and/or on storage device 26.

Figure 3:
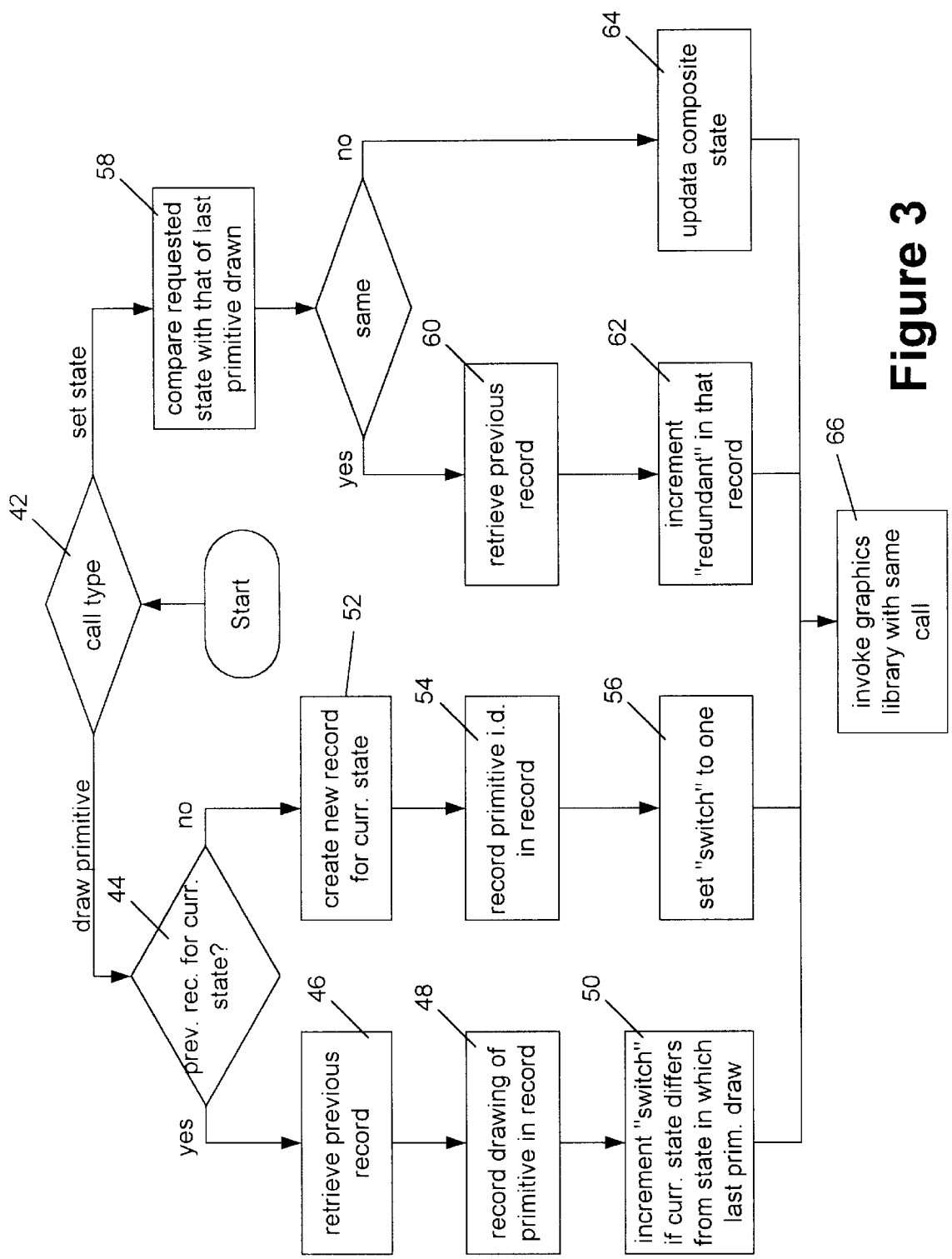
FIG. 3 is a flow chart depicting the cataloging of primitives in a system according to the invention.

FIG. 3 illustrates a method of operation of analyzer 33. Referring to the drawing, in step 42, the method determines the type of call made by applications program 30 to library 32. Calls for drawing primitives are processed in steps 44 et seq. Those for setting states are processed in steps 58 et seq.

In step 44, the method determines whether a record 39 has previously been generated for a current composite graphical state. If so, that record is retrieved (step 46) and modified to indicate that the current primitive is being drawn in that state (step 48). In step 50, the method compares the current composite state with that state in which the last, most recently rendered primitive was drawn. If those two composite states differ, a "switch" counter in the current record is incremented to reflect that the current primitive is being drawn in a different composite state than that last, most recently rendered primitive.

If no record 39 has previously been generated in connection with rendering a primitive in the same state as the current state, the method creates in step 52 a new record for the current composite state. The method then records in that record the identification of the primitive identified in the call (step 54) and initializes the "switch" counter to one (step 56).

In step 58, the method determines whether the substate requested in the state-setting call was included in the composite state with which the last primitive was drawn (e.g., does the call request setting culling, even though that substate is part of the current composite state). If so, the method retrieves the record in which the drawing of that primitive is recorded (step 60) and increments its "redundant" counter (step 62), indicating that the current state-setting call is redundant. If the requested substate is not redundant, the method updates the composite state (step 64) in preparation for drawing another primitive.

In a "real-time" implementation of the type shown in FIG. 2A, following the processing steps outlined above, in step 66, the method can invoke the graphics library 32 with the same procedure call (and parameters) as caused invocation of the corresponding shell procedure in interceptor 31.

The aforementioned operation of the analyzer 33 can be better understood by reference to the following table, in which graphics calls (e.g., state-setting and primitive-drawing instructions) contained in the applications program 30 result in creation and updating of state records 39 in store 38.

| Step | Graphics Call | State | Action | State Records | |
| --- | --- | --- | --- | --- | --- |
| i | enab subst 1 | 100 | set substate | | |
| ii | enab subst 2 | 110 | set substate | | |
| iii | draw prim A | 110 | create new record | state: 1-1-0 Prims: A Switches: 1 Redund: 0 | |
| iv | enab subst 3 | 111 | set substate | (same) | |
| v | disab subst 1 | 011 | set substate | (same) | |
| vi | draw prim B | 011 | create new record | state: 0-1-1 Prims: B Switches: 1 Redund: 0 | state: 1-1-0 Prims: A Switches: 1 Redundant: 0 |
| vii | enab subst 1 | 111 | set substate | (same) | (same) |
| viii | disab subst 3 | 110 | set substate | (same) | (same) |
| ix | draw prim B | 110 | update existing record | (same) | state: 1-1-0 Prims: A,B Switches: 2 Redundant: 0 |
| x | enab subst 3 | 111 | set substate | (same) | (same) |
| xi | disab subst 3 | 110 | set substate | (same) | (same) |
| xii | draw prim A | 110 | update existing record | (same) | state: 1-1-0 Prims: A,B,C Switches: 2 Redundant: 0 |
| xiii | disab subst 1 | 010 | set substate | (same) | (same) |
| xiv | enab subst 3 | 011 | set substate | (same) | (same) |
| xv | draw prim A | 011 | update existing record | state: 0-1-1 Prims: B,A Switches: 2 Redund: 0 | (same) |

-continued

| Step | Graphics Call | State | Action | State Records | |
|------|---------------|-------|--------|---------------|---|
| xvi | draw prim C | 011 | update existing record | state: 0-1-1<br>Prims:<br>B,A,C<br>Switches: 2<br>Redund: 0 | (same) |
| xvii | enab subst 3 | 011 | update existing record | state: 0-1-1<br>Prims:<br>B,A,C<br>Switches: 2<br>Redund: 1 | (same) |

Referring to step (i) of the table, the applications program 30 makes a call to enable substate 1. This may be, for example, a specific lighting configuration or any one of many substates that the library 32 permits for the rendering of primitives. The analyzer 33 responds to the call by updating a composite state data structure (not shown) from 0-0-0 (the default initial state) to 1-0-0.

In step (ii) of the table, the applications program 30 issues a call to enable substate 2. Again, this may be a lighting condition or any other drawing state permitted by library 32. The analyzer 33 responds to the call by updating the composite state to 1-1-0.

In step (iii) of the table, the applications program 30 issues a call to draw primitive A, e.g., a point, line, triangle, polygon or any other primitive that can be rendered by the library 32. The analyzer 33 responds to the call by creating a record 39 for state 1-1-0. In the illustrated embodiment, that record identifies the current composite state and the primitive to be drawn. The record also contains two counters, "switches" and "redundant," which are initialized to one and zero, respectively. The counter "switches" tracks how many times the associated state (here, 1-1-0) has been used to render a primitive subsequent to the rendering of a primitive in another state. The counter "redundant" tracks how many times a state-setting call has requested a state already present in the composite state.

In step (iv), the applications program 30 issues a call to enable substate 3. The graphic usage information gathering section responds by updating the composite state to 1-1-1.

In step (v), the applications program 30 issues a call to disable substate 1. The raphic usage information gathering section responds by updating the composite state to 0-1-1.

In step (vi), the applications program 30 issues a call to draw primitive B. The analyzer 33 responds by creating a record for state 0-1-1. The record identifies that composite state and the primitive to be drawn. As before, the two counters "switches" and "redundant" are initialized to one and zero, respectively.

In steps (vii) B (ix), the applications program 30 issues calls to enable substate 1, disable substate 3 and draw primitive B. The analyzer 33 responds as above by setting the composite state to 1-1-0. It then obtains the corresponding record from the store 38, updates that record to reflect the drawing of primitive B, and returns it to store 38. The accessing and updating of that record is illustrated, by way of example, in the arrows connecting elements 33 and 38 of FIG. 2A. Of interest, the primitive identifying entry of the record reflects that this state has been used to render primitives A and B.

In steps (x)–(xii), the applications program 30 issues calls to enable substate 3, disable substate 3 and draw primitive A. The analyzer 33 responds as shown in the table above. Of interest, the "switches" counter of the 1-1-0 record is not incremented on receiving the call to draw primitive A. This is because the last primitive to be drawn (primitive B) was rendered in the same state (1-1-0) as the current primitive (A). In an alternate embodiment of the invention, the analyzer 33 tracks the superfluous enabling and disabling of substate 3 in an additional field in the record.

In steps (xiii)–(xv), the applications program 30 issues calls to disable substate 1, enable state 3 and draw primitive A. The analyzer 33 responds as shown in the table above.

In step (xvi), the applications program 30 issues a call to draw primitive C. Because the primitive is drawn in the same state as the last primitive, the corresponding state record is updated merely by including the identity of the current primitive.

In step (xvii), the applications program issues a call to enable substate 3. Since that substate is already defined in the composite state, the analyzer 33 updates the corresponding state record to reflect that a redundant state-setting call was issued.

As a result of operation of analyzer 33, the store 38 contains records 39 that characterize the applications program 30. Particularly, those records 39 catalog the primitives drawn by program 30 vis-a-vis the states in which they are drawn. This characterization, heretofore unknown in the art, can give the graphics programmer far greater insight into the operation of program 30 and its interaction with the library 32. Accordingly, it permits the programmer to more readily understand the operation of the program, e.g., for debugging, tuning and/or optimization.

Signals reflecting the characterizations generated by analyzer 33 and contained in 15 store 38 can be output in any conventional form, e.g., in the form of binary data structures (e.g., records) or text. In a preferred embodiment, output section 40 drives those signals to an output device, such as monitor 28, plotter or printer, for display to an operator. One such display can be a textual report identifying the primitives drawn by the program cataloged by states in which they are drawn.

A sample such report, based on the table above, follows. It indicates the numbers of primitives drawn in each state and their types, as well as the number of "switches" and "redundant" calls, as described above.

State: 0-1-1
Total Switches: 2
Total Redundant: 1
Total Primitives A: 1
Total Primitives B: 1
Total Primitives C: 1
State: 1-1-0
Total Switches: 2
Total Redundant: 0
Total Primitives A: 2
Total Primitives B: 1
Total Primitives C: 0
Primitive Summary for All States
Total Primitives A: 3
Total Primitives B: 2
Total Primitives C: 1

Those skilled in the art will appreciate that the example shown in the table and report above is greatly simplified. For a conventional 3D graphics application program 30 and graphics library 32, over one hundred state records may be generated, each recording thousands or millions of primitives. In a preferred embodiment, the invention permits the operator to select substates to be tracked. For example, a programmer may be interested in tracking only illumination-related state changes. Those skilled in the art will appreciate that this facilitates a more focused analysis of graphics usage.

Those skilled in the art will also appreciate that the invention contemplates the inclusion of more information in the records 39 created and maintained by analyzer 33 in store 38. In a preferred embodiment, for example, each record additionally includes information on the number of lines and/or facets drawn in rendering each primitive. That information is preferably also output by section 40. The records and reports can also store and provide information pertaining to the detailed attributes with which primitives are rendered (e.g., color, normals, texture, and the like).

Those skilled in the art will further appreciate that output section 40 can drive reports, other than those in the format shown above, to an appropriate output device. This includes charts, graphs, animations, and so forth.

Methods according to the invention differ substantially from prior art systems, which do not catalog and report usage by state but, rather, simply track the numbers of primitives drawn and, perhaps, the numbers of constituent lines and facets. Use of systems and methodologies according to the invention give the graphics programmer far greater insight into the operation of the program and its interaction with the library. Accordingly, they permit the programmer to more readily understand the operation of the program, e.g., for debugging, tuning and/or optimization.

Described above are methods for improved methods for computer graphics—and, more particularly, for analyzing the generation of graphical images meeting the objects set forth above. It will be appreciated that the embodiments shown in the drawings and described above are merely supplied by way of example and that other embodiments incorporating modifications thereto fall within the scope of the invention. Thus, for example, it will be appreciated that the invention may be applied to analysis of the generation of two-dimensional and animated images, as well as three-dimensional images. Moreover, by way of further example, it will be appreciated that the invention can be used to track attributes (such as color and transformation matrices), in addition to states (such as illumination, shading, and texture). By way of still further example, it will be appreciated that the invention can be applied to object oriented programs, as well as procedure oriented ones. Likewise, the invention can be applied to the interpretation of calls made to non-graphics procedures and libraries, as well as graphics ones.

In view of the foregoing, what we claim is:

1. A method for analyzing a computer instruction sequence that generates a graphical image from a plurality of primitives, each of which is rendered in a composite graphical state, the method comprising the steps of:

A. identifying one or more primitives rendered by the instruction sequence;

B. identifying a composite graphical state in which those primitives are rendered; and C. generating an output representative of a statistical compilation of graphical image-generating characteristics of the instruction sequence, the output indicating one or more of the composite graphical states identified in step (B) and indicating, for each of those composite graphical states, one or more of the primitives rendered by the instruction sequence in that composite graphical state.

2. A method according to claim 1, including the steps of
    executing the instruction sequence on a digital data processor,
    monitoring such execution in step (A) to identify the primitives rendered by the instruction sequence, and
    monitoring such execution in step (B) to identify the composite graphical states in which those primitives are rendered.

3. A method according to claim 1, wherein the instruction sequence comprises source code, the method including the steps of
    interpreting the instruction sequence with a source code interpreter that identifies at least graphical image-generating calls in the instruction sequence,
    monitoring such interpretation in step (A) to identify the primitives rendered by the instruction sequence, and
    monitoring such interpretation in step (B) to identify the composite graphical states in which those primitives are rendered.

4. A method according to claim 1, wherein step (C) includes one or more of the steps of
    storing the characteristic-representative signal generated by step (C) in any of a dynamic and static digital data processor memory,
    generating a display signal based on the characteristic-representative signal generated by step (C), wherein that display signal indicates one or more of the composite graphical states identified in step (B) and indicates, for each of those composite graphical states, one or more of the primitives rendered by the instruction sequence in that composite graphical state.

5. A method according to 1, wherein
    step (B) comprises the step of counting, for each composite graphical state, a number of times that a primitive is rendered in that composite state subsequent to a rendering of a primitive in a different composite state,
    step (C) comprises the step of generating the characteristic-representative signal to indicate, for each of the composite graphical states, the number of times that a primitive is rendered in that composite state subsequent to the rendering of a primitive in a different composite state.

6. A method according to claim 1, wherein the composite state includes one or more sub-states, the method further comprising the steps of
    counting, for each composite graphical state, a number of times during execution of the instruction sequence, that an attempt is made to set a sub-state that is already defined in the current composite state, and wherein
    step (C) comprises the step of generating the characteristic-representative signal to indicate, for each composite graphical state, the number of times during execution of the instruction sequence, that an attempt is made to set a sub-state that is already defined in the current composite state.

7. A method for analyzing a computer instruction sequence that generates a graphical image made up of a plurality of primitives, each of which is rendered in a composite graphical state that is defined by a plurality of substates, the instruction sequence including (i) primitive-drawing instructions for rendering graphical primitives, and (ii) state-setting instructions for setting substates that define a composite graphical state, the method comprising the steps of:

A. responding to a state-setting instruction in the instruction sequence for determining a current composite graphical state;

B responding to a primitive-drawing instruction in the instruction sequence for at least one of generating and updating in a memory of a digital data processor a record storing identities of (i) the current composite graphical state, and (ii) a primitive rendered by that primitive-drawing instruction;

C. accessing a store in the digital data processor to generate, from one or more of the records, a signal representative of a graphical image-generating characteristic of the instruction sequence, that signal indicating one or more composite graphical states in which a primitive is rendered and, for each such composite graphical state, one or more of the primitives rendered in that composite graphical state.

8. A method according to claim 7, comprising the step of identifying state-setting instructions and primitive-drawing instructions in the instruction sequence by any of (i) executing the instruction sequence, and (ii) interpreting a source code form of the instruction sequence.

9. A method according to claim 7, wherein step (B) comprises the steps of making a determination whether a primitive has previously been rendered in the current composite state, responding to a negative such determination for generating a new record for storing the aforementioned identities, and responding to an affirmative such determination for accessing a record storing an identity of the current composite state and updating that record to store an identity of the primitive rendered by that primitive-drawing instruction.

10. A method according to claim 9, comprising the step of determining whether the last most recently rendered primitive was rendered in a composite state different from the current composite state and, if so, incrementing a switching count in the record to reflect a number of times that a primitive is rendered in a composite graphical state differing from that of the last more recently rendered primitive.

11. A method according to claim 7, wherein step (A) includes the steps making a determination whether a substate identified in the state-setting instruction is already included in the current composite state, responding to a positive such determination for accessing a record, if any, storing an identify of the current composite state and incrementing in that record a redundancy count reflecting a number of times that an attempt is made to set a substate that is already defined in the current composite state.

* * * * *

UNITED STATES PATENT AND TRADEMARK OFFICE
CERTIFICATE OF CORRECTION

PATENT NO.    : 5,889,994
DATED         : March 30, 1999
INVENTOR(S)   : John M. Brown et al.

It is certified that error appears in the above-identified patent and that said Letters Patent is hereby corrected as shown below:

<u>Column 4,</u>
Line 53, delete "state-stetting calls." and insert therefor -- state-setting calls. --

<u>Column 7,</u>
Line 46, delete " raphic usage" and insert therefor -- graphic usage --
Line 47, delete "section responds" and insert therefor -- section 36 responds --

<u>Column 8,</u>
Line 33, delete "in 15 store" and insert therefor -- in store --

Signed and Sealed this

Eleventh Day of June, 2002

*Attest:*

*Attesting Officer*

JAMES E. ROGAN
*Director of the United States Patent and Trademark Office*